United States Patent
He et al.

(10) Patent No.: US 12,432,735 B2
(45) Date of Patent: Sep. 30, 2025

(54) SIMULTANEOUS UPLINK TRANSMISSION ON MULTIPLE PANELS IN WIRELESS COMMUNICATION

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Jie Cui, San Jose, CA (US); Oghenekome Oteri, San Diego, CA (US); Sigen Ye, San Diego, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 409 days.

(21) Appl. No.: 17/661,544

(22) Filed: Apr. 29, 2022

(65) Prior Publication Data
US 2023/0354338 A1 Nov. 2, 2023

(51) Int. Cl.
*H04W 72/21* (2023.01)
*H04W 8/24* (2009.01)

(52) U.S. Cl.
CPC ............ *H04W 72/21* (2023.01); *H04W 8/24* (2013.01)

(58) Field of Classification Search
CPC ....... H04W 72/21; H04W 8/24; H04B 7/0628
See application file for complete search history.

(56) References Cited

U.S. PATENT DOCUMENTS

| 2015/0327198 A1* | 11/2015 | Axmon | H04W 56/0045 370/336 |
| 2021/0105725 A1* | 4/2021 | Karjalainen | H04W 52/242 |
| 2021/0195616 A1* | 6/2021 | Venugopal | H04W 72/23 |

(Continued)

FOREIGN PATENT DOCUMENTS

WO  WO-2022055329 A1 * 3/2022 ........... H04B 7/0626

OTHER PUBLICATIONS

3GPP TS 38.133 V 17.5.0, 3rd Generation Partnership Project; Technical Specification Group Radio Access Network, NR; Requirements for support of radio resource management (Release 17), Mar. 2022, pp. 1-678 (Year: 2022).*

(Continued)

*Primary Examiner* — Redentor Pasia
(74) *Attorney, Agent, or Firm* — DICKINSON WRIGHT RLLP

(57) ABSTRACT

Embodiments of the present disclosure relate to uplink simultaneous transmission on multiple panels. According to embodiments of the present disclosure, a user equipment (UE) comprises a transceiver configured to communicate with a network; and a processor communicatively coupled to the transceiver and configured to perform operations. The operations comprise determining a UE assistance information for uplink (UL) Simultaneous Transmission on Multiple Panels (STxMP). The operations further comprise reporting the UE assistance information to the network device. The operations further comprise receiving a UL STxMP enabling indication from the network device. The operations further comprise performing UL STxMP with the network device when the received UL STxMP enabling indication indicates that UL STxMP is enabled.

22 Claims, 7 Drawing Sheets

(56) References Cited

U.S. PATENT DOCUMENTS

| | | | | |
|---|---|---|---|---|
| 2022/0217654 A1* | 7/2022 | Kang | ................... | H04W 52/14 |
| 2022/0256561 A1* | 8/2022 | Kim | ..................... | H04L 5/0051 |
| 2023/0189241 A1* | 6/2023 | Go | ...................... | H04W 52/242 |
| 2023/0239113 A1* | 7/2023 | Kim | ..................... | H04L 5/0053 |
| | | | | 370/329 |
| 2023/0262614 A1* | 8/2023 | Park | ................... | H04W 52/367 |
| | | | | 455/522 |
| 2023/0268971 A1* | 8/2023 | Rahman | .............. | H04B 7/0874 |
| | | | | 375/262 |
| 2023/0354215 A1* | 11/2023 | Huang | ............... | H04W 72/232 |

OTHER PUBLICATIONS

LG, "Performance analysis on STxMP for future enhancement," 3GPP TSG RAN WG1 Meeting #97, R1-1906741, Reno, USA, May 13-17, 2019, pp. 1-6 (Year: 2019).*

ETSI TS 138 306, 5G; NR; User Equipment (UE) radio access capabilities (3GPP TS 38.306 version 16.4.0 Release 16), Apr. 2021, pp. 1-152 (Year: 2021).*

\* cited by examiner

SIMULTANEOUS UPLINK TRANSMISSION ON MULTIPLE PANELS IN WIRELESS COMMUNICATION

TECHNICAL FIELD

Embodiments of the present disclosure generally relate to the field of telecommunications, and in particular, to uplink simultaneous transmission on multiple panels (STxMP).

BACKGROUND

For the fifth generation (5G) system operating above 6 GHz, a user equipment (UE) may comprise multiple antenna panels (also referred to as "UL panels" or simply "panels"). Then, the UE is able to transmit uplink signals from the multiple antenna panels.

SUMMARY

In general, example embodiments of the present disclosure provide a solution for uplink (UL) STxMP.

In a first aspect, there is provided a user equipment. The user equipment comprises a transceiver and a processor. The transceiver is configured to communicate with a network device. The processor is communicatively coupled to the transceiver and configured to determine a UE capability information regarding a maximum transmission timing difference between the UL STxMP in a same slot; and transmit the UE capability information to the network device.

In a second aspect, there is provided a network device. The network device comprises a transceiver and a processor. The transceiver is configured to communicate with a user equipment. The processor is communicatively coupled to the transceiver and configured to receive a UE capability information regarding a maximum transmission timing difference between the UL STxMP in a same slot.

In a third aspect, there is provided a processor of a user equipment according to the first aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1A:
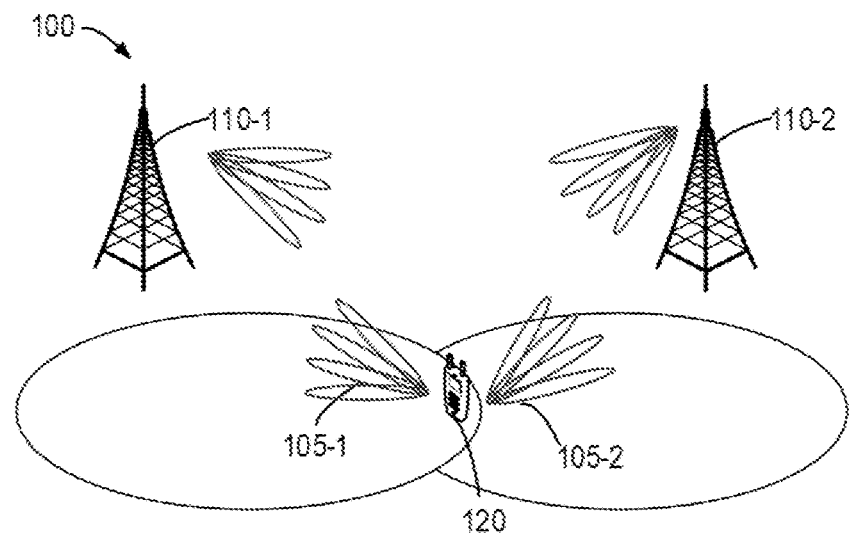
FIG. 1A shows an example communication network in which example embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

The terminology used herein is for the purpose of describing particular embodiments only and is not intended to be limiting of example embodiments. For example, as used herein, the singular forms "a", "an" and "the" are intended to include the plural forms as well, unless the context clearly indicates otherwise. The terms "comprises", "comprising", "has", "having", "includes" and/or "including", when used herein, specify the presence of stated features, elements, and/or components etc., but do not preclude the presence or addition of one or more other features, elements, components and/or combinations thereof. Moreover, when a particular feature, structure, or characteristic is described in connection with some embodiments, it is submitted that it is within the knowledge of one skilled in the art to affect such feature, structure, or characteristic in connection with other embodiments whether or not explicitly described.

It is also to be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, the term "communication network" refers to a network following any suitable communication standards, such as Wi-Fi, fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device (for example, a UE) and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, Wi-Fi1-Wi-Fi7 and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (also referred to as a gNodeB or gNB), a transmission and reception point (TRP), a Remote Radio Unit (RRU), a radio header (RH), a remote radio head (RRH), a relay, a low power node such as a femto, a pico, and so forth, depending on the applied terminology and technology. A RAN split architecture comprises a gNB-CU (Centralized unit, hosting RRC, SDAP and PDCP) controlling a plurality of gNB-DUs (Distributed unit, hosting RLC, MAC and PHY). A relay node may correspond to DU part of the gNB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), a Station (STA) or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

As used herein, the term "TRP" may refer to an antenna array (with one or more antenna elements) available to the network device located at a specific geographical location. For example, a network device may be coupled with multiple TRPs in different geographical locations to achieve better coverage. Alternatively or in addition, multi TRPs may be incorporated into a network device, or in other words, the network device may comprise the multi TRPs. It is to be understood that the TRP may also be referred to as a "panel", which also refers to an antenna array (with one or more antenna elements) or a group of antennas. It is to also be understood that the TRP may refer to a logical concept which may be physically implemented by various manner.

As used herein, the term "multi-panel transmission" refers to transmission from multiple antenna panels. An antenna panel can be considered as one UE antenna port(s) group.

Multi-input multi-output (MIMO) is one of the key technologies in New Radio (NR, also referred to as "5G") systems and is successful in commercial deployment. In Rel-15/16/17, MIMO features are investigated and specified for both Frequency Division Duplex (FDD) and Time Division Duplex (TDD) systems, of which major parts are for downlink MIMO operation.

In Rel-17 MIMO enhancement, UL panel selection function is introduced mainly for the advanced UEs (e.g. customer-premises equipment (CPE), fixed wireless access (FWA), vehicle, industrial devices) to avoid the coverage loss caused by Maximum Permissible Exposure (MPE) mitigation by selecting a suitable unblocked UL panel e.g., based on UE Power Headroom Report (PHR). Here, UL panel selection function refers to the function for a UE to select one or more UL panels for UL transmission to a network device such a TRP.

As mentioned above, in Rel-17, uplink multi-panel transmission (which is also described as "uplink transmission on multiple panels") needs to be enhanced such that a UE can benefit from higher UL coverage and average throughput aspects with UL STxMP. In Rel-18 that is about to start, in the approved Work Item "MIMO Evolution for Downlink and Uplink", it was agreed to facilitate simultaneous multi-panel UL transmission for higher UL throughput and reliability, focusing on multi-TRP, targeting advanced UEs, such as CPE, FWA, vehicle, industrial devices, etc.

Embodiments of the present disclosure propose design choices for apparatus and methods for UL STxMP. A framework of STxMP is first introduced by taking UE complexity and network device configuration flexibility both into account. Then, UE assistance information is introduced for enabling the STxMP function efficiently with minimized overhead. Further, proposals for providing feedback in the case that UE autonomously disables STxMP operation (for example, due to invalid timing difference across multiple UL panels with STxMP operation) are provided. In addition, schemes for notifying the network device about the invalid timing difference situation are also proposed.

In this solution, a UE comprising a transceiver and a processor is provided. The transceiver is configured to communicate with a network device. The processor is communicatively coupled to the transceiver and is configured to determine a UE capability information regarding a maximum transmission timing difference between the uplink simultaneous transmissions on multiple panels (STxMP) in a same slot. The processor is further configured to transmit the UE capability information to the network device. The processor is further configured to transmit, to the network device, assistance information for the STxMP; and receiving, from the network device, an indication indicating whether the STxMP is enabled for the UE.

Further, a network device comprising a transceiver and a processor is also provided. The transceiver is configured to communicate with a UE. The processor is communicatively coupled to the transceiver and is configured to receive a UE capability information regarding a maximum transmission timing difference between the uplink simultaneous transmissions on multiple panels (STxMP) in a same slot. The processor is further configured to receive, from the UE, assistance information for the STxMP, determine whether the STxMP can be enabled for the UE; and send, to the UE, an indication indicating whether the STxMP is enabled for the UE.

According to embodiments of the present disclosure, the UE capability information regarding STxMP is designed to support STxMP from the UE to the network device, and the assistance information is designed for the network device to determine whether the STxMP can be enabled for the UE. In this way, UL STxMP is facilitated and higher UL throughput and reliability can be realized with minimized overhead.

Principle and implementations of the present disclosure will be described in detail below with reference to FIGS. 1-8. FIG. 1A shows an example communication network 100 in which embodiments of the present disclosure can be implemented. The network 100 includes two TRPs 110-1 and 110-2, which may be collectively referred to as "TRPs 110" or individually referred to as a "TRP 110", and a UE 120 served by the TRP 110. TRP 110-1 and TRP 110-2 may be in a same cell created by a same network device, and may be in two different cells created by two different network devices. The UE 120 may have a plurality of panels for UL transmission. For example, for illustrative purpose, FIG. 1 shows that the UE 120 has two UL panels 105-1 and 105-2, which may be collectively referred to as "panels 105" or individually referred to as a "panel 105".

It is to be understood that the numbers of TRPs 110, UEs 120 and panels 105 as shown in FIG. 1 are only for illustrative purpose without suggesting any limitations. The network 100 may include any suitable number of TRP 110 and UE 120 and the UE 120 may include any suitable number of panel 105 adapted for implementing embodiments of the present disclosure.

In the communication network 100, the TRP 110 can communicate data and control information to the UE 120 and the UE 120 can also communication data and control information to the TRP 110. A link from the TRP 110 to the UE 120 is referred to as a downlink (DL) or a forward link, while a link from the UE 120 to the TRP 110 is referred to as an uplink (UL) or a reverse link. For uplink transmission on multiple panels 105, the UE 120 may transmit data and control information from different panels 105 to a corresponding TRP 110, for example, a corresponding gNodeB (gNB). The signals from the multiple panels 105 may be transmitted in Frequency Divide Multiplexing (FDM) mode, Space Divide Multiplexing (SDM) mode, or hybrid FDM/SDM mode. Data transmission from UE 120 to TRP 110 using the multiple panels 105 at the same time may also be referred to as "uplink simultaneous transmission on multiple panels (STxMP)".

In some embodiments, the UE 120 may determine a capability information regarding STxMP. As used herein, simultaneous transmissions may include, but are not limited to, transmissions which occur at the same time and/or transmissions which occur in a substantially contemporaneous manner. The capability information may be based on a maximum transmission timing difference (MTTD) in a same slot across multiple panels 105 of the UE 120. In other words, a value of MTTD may be included in the capability information and may serve as a threshold which is used to be compared with a real-time transmission timing difference.

For example, for synchronous UL STxMP, the UE 120 is capable of handling at least a relative reception timing difference (RTD) of up to $X_s$ μs between the slot timing of the signals received from a first panel (for example, panel 105-1 as shown in FIG. 1A) of a cell and a second panel (for example, panel 105-2 as shown in FIG. 1A) of the cell at UE 120 provided that the UE 120 indicates that it is capable of synchronous STxMP. In such a case, $X_s$ can be denoted as $X_s = T_{CP, \mu}$ where $T_{CP, \mu}$ represents the Cyclic Prefix (CP) length of the active UL BWP with numerology μ. Alternatively, $X_s$ can be obtained by reusing the existing MTTD value defined for intra-band carrier aggregation (CA) or inter-band CA, i.e., in such a case, $X_s = 5.21$ μs (for example, a shared radio frequency (RF) frontend).

For another example, for asynchronous UL STxMP, the UE 120 is capable of handling at least a relative reception timing difference (RTD) of up to $X_{as}$ μs between the slot timing of the signals received from a first panel (for example, panel 105-1 as shown in FIG. 1A) of a cell and a second panel (for example, panel 105-2 as shown in FIG. 1A) of the cell at the UE 120 provided that the UE 120 indicates that it is capable of asynchronous STxMP. In such a case, $X_{as}$ can be denoted as $X_{as} = T_{slot, \mu}/2$ where μs the numerology of the active UL BWP. Alternatively, $X_{as}$ can be obtained by reusing the existing MTTD value defined for inter-band New Radio (NR) CA, for example, $X_{as} = 34.6$ μs for frequency range 1 (FR1) and $X_{as} = 8.5$ μs for FR2.

In some embodiments, the capability information may indicate that the UE 120 supports at least one of a synchronous STxMP or an asynchronous STxMP.

In some embodiments, as described above, the synchronous STxMP and asynchronous STxMP may differ in terms of the value of the transmission or reception timing difference between the STxMPs.

In some embodiments, the UE 120 may further transmit the capability information regarding STxMP to TRP 110.

Figure 1B:
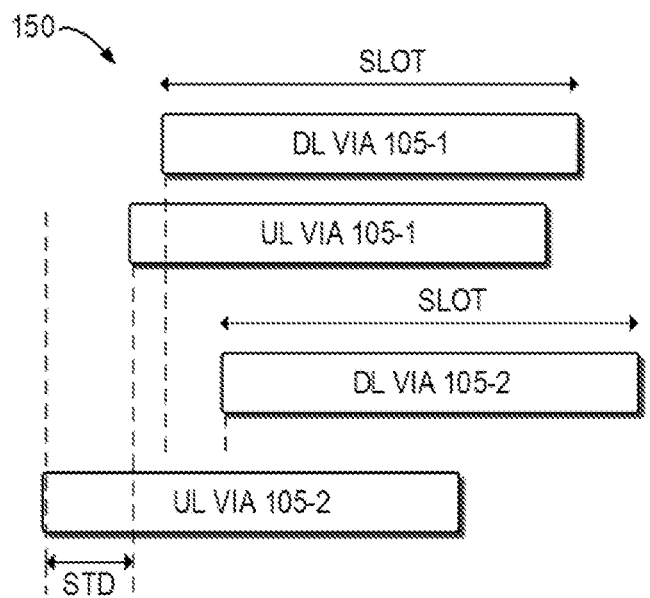
FIG. 1B illustrates a schematic diagram of Slot Timing Difference (STD) from two panels for UL StxMP according to some embodiments of the present disclosure.

Reference is now made to FIG. 1B. FIG. 1B illustrates a schematic diagram 150 of a Slot Timing Difference (STD) from two panels for synchronous and asynchronous UL StxMP according to some embodiments of the present disclosure. As illustrated in FIG. 1B, different UL Timing advance (TA) values may be applied for two UL panels 105-1 and 105-2 toward TRP 110-1 and 110-2, respectively. The valid MTTD of a slot across panel 105-1 and 105-2 may be varied because of synchronous STxMP or asynchronous STxMP UE capability report, as described above in connection with FIG. 1A.

As illustrated in FIG. 1B, in a same slot, DL transmission via panel 105-1 and 105-2 may have different reception timing at UE 120. The DL reception timing difference is denoted by "RTD" which is short for reception timing difference. In a same slot, UL transmission via panel 105-1 and 105-2 may also have different transmission timing at UE 120. The UL transmission timing difference is denoted by TTD which is short for transmission timing difference.

In some embodiments, the capability information may be reported by the UE 120. In addition or alternatively, the capability information may be reported for each frequency band in a band combination that is supported by the UE 120. In addition or alternatively, the capability information may be reported for each subcarrier spacing (SCS) that is supported by the UE 120 in a frequency band of a band combination.

For example, the capability information (for example, the capability information defined with the synchronous or asynchronous STxMP) may be reported to the TRP 110 per UE 120. In addition or alternatively, the capability information may be reported for each frequency band in a band combination that is supported by the UE 120. For example, the synchronous or asynchronous STxMP may be reported to the TRP 110 per feature set (FS). Here, feature set refers to the set of all features associated with a single functionability of interest. In addition or alternatively, the capability information may be reported to the TRP 110 for each subcarrier spacing (SCS) that is supported by the UE 120 in a band of a band combination. This design is mainly motivated by the threshold variances for synchronous or asynchronous STxMP in different frequency range (FR) due to the different numerologies. One exemplified ASN.1 structure for this design may be provided as follows:

```
BandCombinationParameters-r18::= SEQUENCE {
   STxMP-Support-r18     SEQUENCE
   asynchronous-r18      ENUMERATED {supported} OPTIONAL,
   allowedSCS-List       SEQUENCE (SIZE (1..maxSCSs)) OF SubcarrierSpacing
   OPTIONAL, -- Need R
}
```

Figure 2:
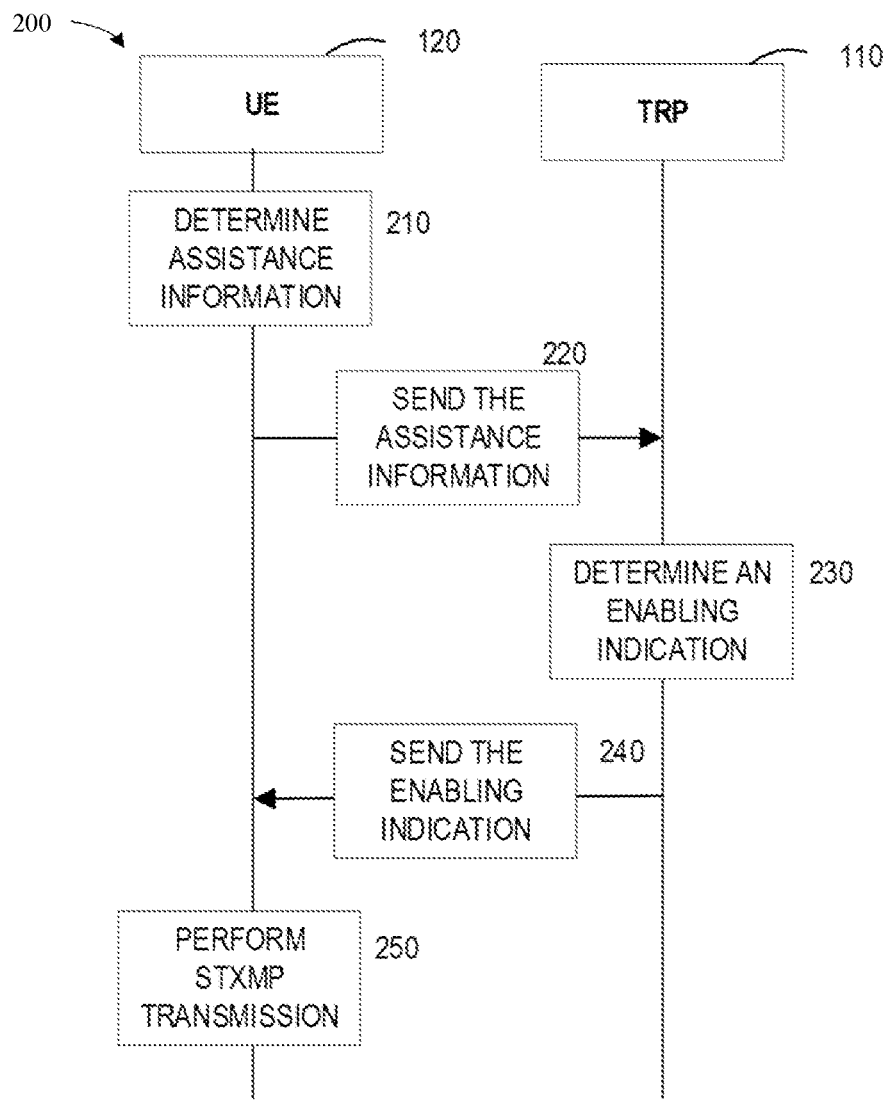
FIG. 2 illustrates a flowchart of an example method for obtaining UL STxMP enabling information according to some embodiments of the present disclosure.

Reference is now made to FIG. 2. FIG. 2 is a flowchart of an example method for obtaining UL STxMP enabling information according to some embodiments of the present disclosure. For the purpose of discussion, the method 200 will be described with reference to FIGS. 1A and 1B. The method 200 may involve the UE 120 and TRP 110 shown in FIG. 1A.

As illustrated in FIG. 2, the UE 120 may compute (determine) STxMP-specific assistance information (step 210). The STxMP-specific assistance information is UE assistance information provided to the TRP 110 for the TRP 110 to determine whether UL STxMP is enabled for the UE 120 or not. The assistance information comprises at least one of a downlink (DL) reception timing difference (RTD) of a slot across the multiple panels, or an uplink (UL) transmission timing difference (TTD) of a slot across the multiple panels. For example, the STxMP-specific assistance information may be configured as the DL RTD of a slot across two panels 105-1 and 105-2. Such a configuration is designed to avoid unnecessary UL timing acquisition procedure triggering (for example, in a Contention Free Random Access (CFRA) procedure) for the second UL panel assuming DL and UL channel reciprocity. For example, if the timing difference is larger than the maximum transmission timing difference (MTTD) contained in the capability information reported by the UE 120, it is not necessary to trigger CFRA-based procedure to obtain UL timing for the second UL panel. In this way, the overhead can be minimized. In addition or Alternatively, the STxMP-specific assistance information may be configured as the UL TTD of a slot across two panels 105-1 and 105-2, and such a configuration is designed to provide the precise assistance information for STxMP enabling, for example, in both TDD and FDD systems.

Different signaling schemes can be considered for triggering the UE 120 to report assistance information to enable STxMP operation. For example, RRC signaling may be used to provide STxMP-specific assistance information. In some embodiments, prior to computing (determining) the STxMP-specific assistance information by the UE 120, the UE 120 may receive a signaling from the TRP 110 for triggering the UE 120 to report the STxMP-specific assistance information. For example, such a signaling may be a RRC message (like a RRCReConfiguration message). In other words, the TRP 110 may send a RRCReConfiguration message to the UE 120 for triggering the UE 120 to report the STxMP-specific assistance information, and at the UE 120, in response to the received RRCReConfiguration message, UE 120 may compute (determine) the STxMP-specific assistance information required by the TRP 110 accordingly for the TRP 110 to determine whether UL STxMP can be enabled for the UE 120 (step 210).

For another example, such a signaling may be a downlink control information (DCI) message. The DCI may have a DCI Format 0_1 or 0_2, the DCI message may comprise a field (for example, a new 'PTD Request' field) to indicate the transmission of the assistance information (as illustrated in FIG. 3A).

Figure 3A:
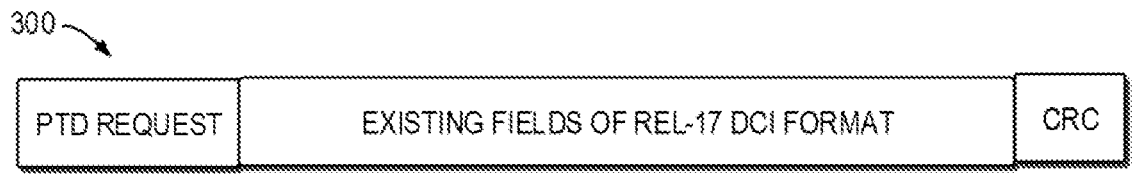
FIG. 3A illustrates a schematic enhanced Downlink Control Information (DCI) Format 0_1 for triggering STxMP assistance information over PUSCH according to some embodiments of the present disclosure.

FIG. 3A illustrates a schematic diagram 300 of an enhanced DCI Format 0_1 to trigger STxMP assistance information over PUSCH according to some embodiments of the present disclosure. As illustrated in FIG. 3A, a 'PTD request' field is newly added in the DCI Format 0_1. When all the bits of 'PTD request' field in DCI are set to zero, no PTD is requested. The association between cells (CCs) and the codepoint of PTD state may be configured by RRC signaling. Table 1 provides one exemplified association between PTD states and the triggered CCs for timing different report by dividing CCs into different CC groups.

TABLE 1

'PTD request' field for PDCCH with uplink DCI Format in UE-specific search space

| Value of 'PTD request' field | Description |
| --- | --- |
| '00' | No aperiodic PTD report is triggered |
| '01' | Aperiodic PTD report is triggered for a first set of CCs configured by higher layers for the UEs |
| '02' | Aperiodic PTD report is triggered for a second set of CCs configured by higher layers for the UEs |
| '03' | Aperiodic PTD report is triggered for a third set of CCs configured by higher layers for the UEs |

As shown in Table 1, all CCs are divided into three different CC groups, i.e., a first set of CCs, a second set of CCs, and a third set of CCs, therefore a 2-bit PTD request field is provided in DCI Format 0_1 or 0_2 to indicate (for example, via RRC signaling) aperiodic PTD report is triggered for which CC group. For example, if the value of 'PTD request' field is set to '00' in the DCI, then the UE 120, upon reception of the DCI, is aware that no aperiodic PTD report is triggered. For another example, if the value of 'PTD request' field is set to '10' in the DCI, then the UE 120, upon reception of the DCI, is aware that aperiodic PTD report is triggered for a second set of CCs. In this case, if the TRP 110 belongs to the second set of CCs, then the UE 120 may send an aperiodic PTD report to the TRP 110 in accordance with the reception of the DCI with a 'PTD request' field set to '10'.

Figure 3B:
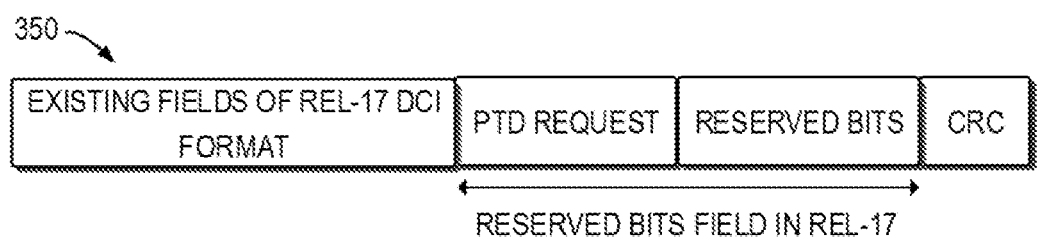
FIG. 3B illustrates a schematic enhanced DCI Format 0_0 for triggering STxMP assistance information over PUSCH according to some embodiments of the present disclosure.

Alternatively, the DCI may have DCI Format 0_0 and at least one of reserved bits in the DCI Format 0_0 is reused to indicate the transmission of the assistance information (as illustrated in FIG. 3B).

FIG. 3B illustrates a schematic diagram 350 of an enhanced DCI Format 0_0 for triggering STxMP assistance information over PUSCH according to some embodiments of the present disclosure. As illustrated in FIG. 3B, a "PTD request" field is introduced by reusing the bits from the 'reserved bits' field existing in Rel-17 DCI Format. In this way, the length of existing DCI Format can be maintained.

After the STxMP-specific assistance information is determined, the UE 120 may then send the computed (determined) STxMP-specific assistance information to the TRP 110 (step 220).

The TRP 110, upon receiving the STxMP-specific assistance information from the UE 120 (step 220), may decide (determine) whether or not to enable UL STxMp for the UE 120 (step 230). For example, if the DL RTD and/or UL TTD reported in the STxMP-specific assistance information is less than the MTTD reported in the capability information by the UE 120, the TRP 110 may decide (determine) to enable UL STxMP for the UE 120. For another example, if both or one of the DL RTD and UL TTD reported in the STxMP-specific assistance information are larger than the MTTD reported in the capability information by the UE 120, the TRP 110 may decide (determine) not to enable UL STxMP for the UE 120.

After deciding (determining) whether or not to enable UL STxMP for the UE 120 (step 230), the TRP 110 may send a STxMP enabling indication to the UE 120 and the UE 120 may receive the STxMP enabling indication from TRP 110 (step 240). The STxMP enabling indication indicates whether UL STxMP for the UE 120 is enabled or not.

If the STxMP enabling indication indicates that UL STxMP for the UE 120 is enabled, the UE 120 may perform UL STxMP from then on (step 250). Otherwise the UE 120 is not allowed to perform UL STxMP even though it has such abilities.

In some embodiments, if the UL transmission timing difference (TTD) exceeds the respective timing difference threshold $X_s$ or $X_{as}$, then UE 120 may stop transmission on a first panel of the two UL panels 105-1 and 105-2. For example, in some embodiments, the first UL panel which may stop UL STxMP of the two UL panels 105-1 and 105-2 may be explicitly configured by RRC signaling. For example, the TRP 110 may send a radio resource control (RRC) signaling indicating which panel of the panels 105-1 and 105-2 is the first panel. The UE 120, upon receiving such a RRC signaling, may determine the first panel based on the RRC signaling. For example, if the TRP 110 sends a RRC signaling indicating that the UL panel 105-1 is selected (determined) as the first UL panel to stop UL STxMP, then the UE 120, upon receiving the RRC signaling, can determine that the first UL panel is the UL panel 105-1 based on the RRC signaling. In addition, after determination of the first panel based on the RRC signaling, the UE 120 may further stop UL transmission on the determined first panel (in this example, the panel 105-1).

In some embodiments, in addition or alternatively, the UL panel associated with a first sounding reference signal (SRS) resource set or a first SRS resource index (SRI) field (e.g., intra-CU (central unit) or inter-DU (distributed unit) with different physical cell identifiers (PCIs) and handover procedure) may be selected as the first panel and the UE 120 may stop UL transmission on it based on use cases. In addition or alternatively, the UL panel associated with a second SRS resource set which is adjacent to the first SRS resource set or a second SRI field (e.g., intra-CU or inter-DU without triggering handover procedure) which is adjacent to the first SRI field may be selected as the first panel and the UE 120 may stop UL transmission on it based on use cases.

In some embodiments, in addition or alternatively, the UL panel corresponding to a signal quality which is below threshold may be selected as the first panel and the UE 120 may stop the UL transmission on it. For example, the UL panel corresponding to the smallest measured Layer 1 Reference Signal Receiving Power (L1-RSRP) may be selected as the first panel and the UE 120 may stop the UL transmission on it. In addition or alternatively, the UL panel corresponding to the largest downlink pathloss may be selected as the first panel and the UE 120 may stop the UL transmission on it. For example, to facilitate the detection and soft combining/soft buffer management at the gNB side, in view that the L1-RSRP or DL pathloss measurement is performed by UE without reporting to the TRP 110 and therefore is unknown at TRP side, UE 120 may report to the TRP 110 the panel index or an equivalent logic ID (e.g., the associated SRI field/SRS resource set) that the UE 120 may stop transmission.

In some embodiments, in addition or alternatively, a panel without uplink control information (UCI) multiplexing on a physical uplink shared channel (PUSCH) transmission may be determined as the first panel to stop UL STxMP to the TRP 110. For example, a 1-bit uplink panel indicator (UPI) may be encoded and piggyback over the transmitted PUSCH to indicate which panel of two panels 105-1 and 105-2 the UE 120 stops UL transmission because of the invalid transmission timing difference (TTD), as shown in FIG. 4.

Figure 4:
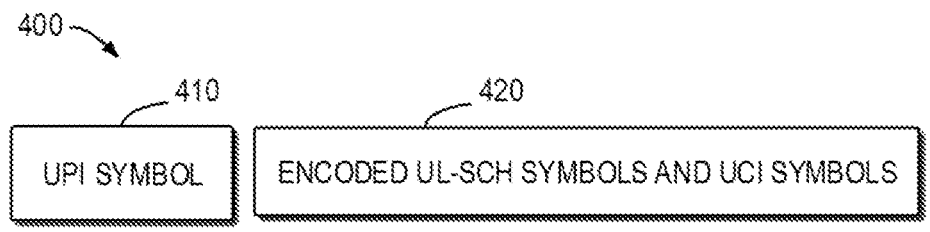
FIG. 4 illustrates a schematic format of a new Uplink Panel Indicator (UPI) Information Element (IE) over Physical Uplink Shared Control Channel (PUSCH) resource according to some embodiments of the present disclosure.

FIG. 4 illustrates a schematic format 400 of a new Uplink Panel Indicator (UPI) Information Element (IE) communicated over a Physical Uplink Shared Control Channel (PUSCH) resource according to some embodiments of the present disclosure. As illustrated in FIG. 4, a 1-bit UL UPI is newly configured and encoded into UPI symbols 410. Then the UPI symbols 410 and encoded UL-SCH symbols and UCI symbols 420 are concatenated, and the concatenated symbols are transmitted over the PUSCH to TRP 110. Among the concatenated symbols, the UPI symbols are piggyback over the transmitted PUSCH to indicate which panel among the two panels UE stops transmission due to the invalid timing difference. For example, if the UL TTD of panel 105-1 exceeds the respective timing difference threshold (for example, MTTD), in which case the timing difference is considered to be "invalid", the UE 120 may stop UL transmission on panel 105-1, and the UPI symbols are piggyback over the transmitted PUSCH to indicate that the UE 120 stops transmission on panel 105-1 because the transmission timing difference (TTD) of two panels 105-1 and 105-2 exceeds the respective timing difference threshold. Here we use "invalid" to indicate the fact (and also the reason why the UE 120 stops transmission on panel 105-1) that the UL TTD of panel 105-1 exceeds the respective timing difference threshold (for example, MTTD).

In some embodiments, in addition or alternatively, if separate modulation and coding scheme (MCS) fields are applied for PUSCH on different UL panels by adding a new MCS field, the UL panel with lower MCS index may be selected as the first panel to stop UL transmission. For example, if separate MCS fields are applied for UL STxMP of different UL panels 105-1 and 105-2 by adding a new MCS field, and the UL panel 105-1 corresponds to a MCS index 8 and the UL panel 105-2 corresponds to a MCS index 10, then the UL panel 105-1 may be selected as the first panel to stop UL transmission, since its MCS index (=8) is lower than the MCS index of UL panel 105-2 (which, in this case, is 10).

In some embodiments, in addition or alternatively, in order to avoid recurrence of UCI multiplexing operation, which may increase UE complexity, the UL panel without uplink control information (UCI) multiplexing on PUSCH may be selected as the first panel for dropping UL transmission to TRP 110. For example, if the UCI of UL panel 105-1 is multiplexed on PUSCH while the UCI of UL panel 105-2 is not multiplexed on PUSCH, then UL transmission on UL panel 105-2 may be dropped. This is because, if UL transmission on UL panel 105-1 (instead of on UL panel 105-2) is dropped, then next time the UCI of UL panel 105-1 needs to be multiplexed and repeated on PUSCH, and the cost of doing so is larger than the above-mentioned example, in which case UCI on UL panel 105-2 (which is not multiplexed) is dropped.

In some embodiments, the UE 120 may further report the stopping of the transmission (UL STxMP) on the first panel to the TRP 110. For example, after panel 105-1 is selected (determined) as the first panel and the UE 120 stops UL STxMP on panel 105-1, the UE 120 may further report the stopping of the UL STxMP on panel 105-1 to the TRP 110, to let the TRP 110 to be aware that UL STxMP has already stopped on panel 105-1. In this way, it is not necessary for the TRP 110 to try to receive UL STxMP from panel 105-1 in vain, thus overhead can be minimized and resource can be utilized more efficiently.

In some embodiments, if the UE 120 is configured with STxMP operation and multiple TPRs 110 may be not time synchronized, the uplink transmission timing difference across the two panels 105-1 and 105-2 may be reported to the TRP 110 by the UE 120. In some embodiments, the UE 120 may receive from the TRP 110 a RRC signaling indicating a periodic measurement and report of the uplink transmission timing difference between the two panels 105-1 and 105-2, and then the uplink transmission timing difference between the two UL panels 105-1 and 105-2 (including reporting interval) may be measured and reported periodically to the TRP 110 by the UE 120. In addition or alternatively, the L1-RSRP for a second panel may also be reported to facilitate network decision on handover operation.

In some embodiments, alternatively, in response to detecting an event, the UE 120 may transmit the transmission timing difference to the TRP 110, for example, to minimize the signaling overhead. For example, when the transmission timing difference exceeds the maximum value of reported UE capability (for example, synchronous or asynchronous UL MTTD), a transmission timing difference report across panels 105-1 and 105-2 may be triggered.

In some embodiments, alternatively, the transmission timing difference between the two panels 105-1 and 105-2 may be transmitted from the UE 120 to the TRP 110 via a medium access control (MAC) control element (CE). For example, the MAC CE for reporting the transmission timing difference is identified by a MAC subheader with a logical channel identifier (LCD). It has a fixed size of zero bits. In this way, an advantage of a minimized signaling overhead may be obtained. For another example, a new MAC CE having one octet may be introduced for reporting the uplink transmission timing difference between the two panels 105-1 and 105-2 for each serving cell. In this case, the new MAC CE is identified by a MAC CE subheader with LCD and has a fixed size of a single new Octet, as illustrated in FIG. 5.

Figure 5:
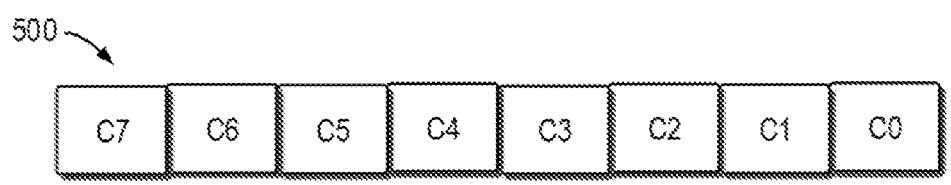
FIG. 5 illustrates an example of a Medium Access Control (MAC) Control Element (CE) for reporting transmission timing differences between two panels according to some embodiments of the present disclosure.

FIG. 5 illustrates an example of a MAC CE 500 for reporting transmission timing differences between two panels (for example, the two UL panels 105-1 and 105-2 of UE 120 as illustrated in FIG. 1A) for CCs according to some embodiments of the present disclosure. As illustrated in FIG. 5, fields of $C_i$ (i=0, 1, 2, ... 7) is included in the new 1-Octet MAC-CE. If there is a cell configured for the MAC entity with CellIndex i, the $C_i$ field indicates the invalid transmission timing difference status of the Cell with CellIndex i.

Alternatively, in some embodiments, the UE 120 with STxMP capability may receive a RRC configuration indicating a set of scheduling request (SR) resources in a PUCCH transmission, and then transmits to the TRP 110 via the corresponding SR from the set of scheduling request (SR) resources to report the uplink transmission timing difference between the two panels 105-1 and 105-2 on a serving cell exceeds the UE capability. For example, the UE 120 may be provided by a dedicated RRC signaling, a set of SR resources in a PUCCH transmission using either PUCCH format 0 or PUCCH format 1. The RRC configuration may include a periodicity in symbols or slots and an offset in slots for a PUCCH transmission conveying SR. In such a case, a single SR resource may be provided for a given UE to minimize the signaling overhead. Alternatively, for each CC enabled with STxMP operation, a dedicated SR may be provided. As a consequence, more than one SR resources may be provided in CA case.

Figure 6:
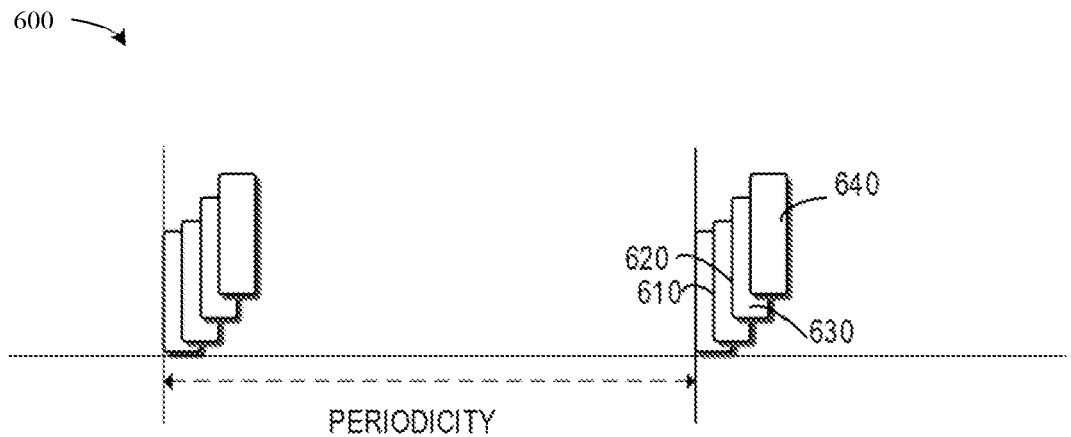
FIG. 6 illustrates an example of an exemplified Code Division Multiplexed (CDMed) Scheduling Request (SR) resource configuration for multiple cells (CCs) in Carrier Aggregation (CA) case according to some embodiments of the present disclosure.

For another example, the UE 120 may transmit a PUCCH in the PUCCH resource for the corresponding SR if the measured TTD exceeds the cross-panel MTTD value reported in the UE capability information, as illustrated in FIG. 6. FIG. 6 illustrates a diagram 600 of an exemplary CDMed SR resource configuration for multiple CCs in CA case according to some embodiments of the present disclosure. As illustrated in FIG. 6, resource configurations comprises SR 610, 620, 630 and 640 for each of a plurality of CCs, and those resource configurations are CDMed on PUCCH. If the measured TTD (for example, via assistance information reporting) exceeds the cross-panel MTTD value reported by UE 120 (for example, in the capability information reported via UE capability reporting), the UE 120 may transmit a PUCCH in the PUCCH resource for the corresponding SRs.

Figure 7:
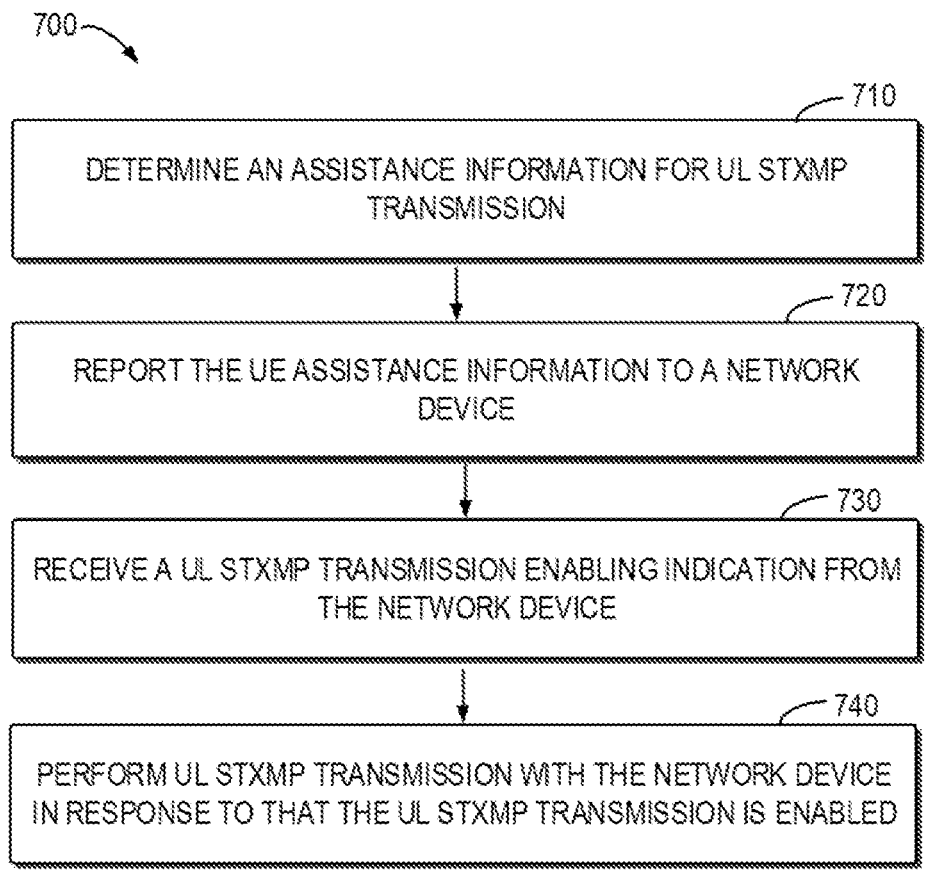
FIG. 7 illustrates an example method for UE to require STxMP enabling information according to some embodiments of the present disclosure.

FIG. 7 illustrates an example method 700 for the UE 120 to require STxMP enabling information from the TRP 110 according to some embodiments of the present disclosure. The method 700 can be performed after the UE 120 has transmitted its capability information to the TRP 110, and can be implemented at UE 120 as shown in FIG. 1A. For the purpose of discussion, the method 700 will be described also with reference to FIG. 1A and FIG. 2.

At block 710, UE 120 determines (computes) a STxMP-specific assistance information for UL STxMP to the TRP 110.

At block 720, UE 120 reports the STxMP-specific assistance information to the TRP 110.

At block 730, UE 120 receives a UL STxMP enabling indication from the TRP 110.

At block 740, in response to that the UL STxMP enabling indication indicates that UL STxMP is enabled for UE 120, UE 120 performs UL STxMP to the TRP 110 from then on.

It should be noted that FIG. 7 is illustrated only for exemplary purpose. In some embodiments, prior to computing (determining) the STxMP-specific assistance information by the UE 120 at block 710, the TRP 110 may send a RRC message (for example, an RRCReConfiguration message) to UE 120 to trigger the UE 120 to transmit the STxMP-specific assistance information to the TRP 110. In other words, the TRP 110 may send a RRCReConfiguration message to the UE 120 to trigger the UE 120 to report (transmit) the STxMP-specific assistance information to the TRP 110, and at the UE 120, in response to the reception of the RRCReConfiguration message from the TRP 110, UE 120 may compute (determine) a STxMP-specific assistance information, as illustrated in block 710 of FIG. 7.

Representative Embodiments

In some embodiments, a user equipment (UE) includes: i) a transceiver configured to communicate with a network device; and ii) a processor communicatively coupled to the transceiver and configured to: determine a UE capability information regarding a maximum transmission timing difference between uplink simultaneous transmissions on multiple panels (STxMP) in a same slot; and transmit the UE capability information to the network device. In some embodiments, the UE capability information indicates at least one of: the UE supporting synchronous STxMP, or the UE supporting asynchronous STxMP. In some embodiments, the synchronous STxMP and the asynchronous STxMP differ in terms of a value of maximum transmission timing difference between the synchronous STxMP and the asynchronous STxMP. In some embodiments, the processor of the UE is further configured to: i) report the UE capability information for the UE; ii) report the UE capability information for each frequency band in a band combination that is supported by the UE; or iii) report the UE capability information for each subcarrier spacing (SCS) that is supported by the UE in a band of a band combination. In some embodiments, the processor of the UE is further configured to: transmit, to the network device, assistance information for the STxMP; and receive, from the network device, an indication indicating whether the STxMP is enabled for the UE. In some embodiments, the assistance information includes at least one of: a downlink (DL) reception timing difference (RTD) of a slot across the multiple panels; or an uplink (UL) Transmission Timing Difference (TTD) of a slot across the multiple panels. In some embodiments, the processor of the UE is further configured to receive, from the network device, signaling to trigger transmission of the assistance information. In some embodiments, the processor of the UE is further configured to perform the STxMP with the network device in accordance with a determination that the indication indicates that the STxMP is enabled for the UE. In some embodiments, the signaling includes at least one of: a radio resource control (RRC) message, or downlink control information (DCI). In some embodiments, the DCI has DCI Format 0_1 or 0_2, and comprises a field to indicate transmission of the assistance information. In some embodiments, the DCI has DCI Format 0_0 and at least one of reserved bits in the DCI Format 0_0 is reused to indicate transmission of the assistance information. In some embodiments, the processor of the UE is further configured to: in accordance with a determination that the indication indicates that the STxMP is disabled for the UE, determine a first panel of the multiple panels; and stop transmission on the first panel. In some embodiments, the processor of the UE is further configured to: receive a radio resource control (RRC) signaling indicating the first panel; and determine the first panel based on the RRC signaling. In some embodiments, the processor of the UE is further configured to determine a panel as the first panel based on at least one of: i) the panel being associated with a first sounding reference signal (SRS) resource set index (SRI) field or a second SRI field adjacent to the first SRI field; ii) the panel corresponding to a signal quality that is below a threshold; iii) the panel having a lower modulation and coding scheme (MCS) index; iv) the panel without uplink control information (UCI) multiplexing on a physical uplink shared channel (PUSCH) transmission; or v) any combination thereof. In some embodiments, the processor of the UE is further configured to report, to the network device, stopping of transmission on the first panel. In some embodiments, the processor is further configured to transmit, to the network device, an uplink transmission timing difference across at least two panels of the multiple panels. In some embodiments, the processor of the UE is further configured to: i) receive, from the network device, a radio resource control (RRC) signaling indicating a periodic measurement and report of the uplink transmission timing difference across the at least two panels of the multiple panels; and ii) periodically transmit, to the network device, the uplink transmission timing difference across the at least two panels of the multiple panels. In some embodiments, the processor of the UE is further configured to, in response to detecting an event, transmit, to the network device, the uplink transmission timing difference across the at least two panels of the multiple panels. In some embodiments, the processor of the UE is further configured to transmit, to the network device, the uplink transmission timing difference across at least two panels of the multiple panels via a medium access control (MAC) control element (CE). In some embodiments, the MAC CE has one octet and indicates the uplink transmission timing difference across the at least two panels of the multiple panels for each serving cell. In some embodiments, the processor of the UE is further configured to: i) receive, from the network device, a radio resource control (RRC) configuration indicating a set of scheduling request (SR) resources in a physical uplink control channel (PUCCH) transmission; and ii) transmit, to the network device, via a corresponding SR from the set of SR resources to report the uplink transmission timing difference across the at least two panels of the multiple panels on a serving cell exceeds the UE capability. In some embodiments, the RRC configuration includes periodicity in symbols or slots and an offset in slots for the PUCCH transmission.

In some embodiments, a network device includes: i) a transceiver configured to communicate with a user equipment (UE); and ii) a processor communicatively coupled to the transceiver and configured to receive UE capability information regarding a maximum transmission timing difference between uplink simultaneous transmissions on multiple panels (STxMP) in a same slot. In some embodiments, the UE capability information indicates at least one of: i) the UE supporting a synchronous STxMP, or ii) the UE supporting an asynchronous STxMP. In some embodiments, the synchronous STxMP and asynchronous STxMP differ in terms of a value of maximum transmission timing difference between the synchronous STxMP and the asynchronous STxMP. In some embodiments, the processor of the network device is further configured to: i) receive the UE capability information for the UE; ii) receive the UE capability information for each frequency band in a band combination that is supported by the UE; or iii) receive the UE capability information for each subcarrier spacing (SCS) that is supported by the UE in a band of a band combination. In some embodiments, the processor of the network device is further configured to: i) receive, from the UE, assistance information for the STxMP; ii) determine whether the STxMP can be enabled for the UE; and iii) send, to the UE, an indication indicating whether the STxMP is enabled for the UE. In some embodiments, the assistance information includes at least one of: a downlink (DL) reception timing difference (RTD) of a slot across the multiple panels; or an uplink (UL) Transmission Timing Difference (TTD) of a slot across the multiple panels. In some embodiments, the processor of the network device is further configured to: i) in accordance with a determination that a downlink (DL) reception timing difference (RTD) and/or an uplink (UL) transmission timing difference (TTD) reported in the assistance information is less than a threshold reported in the UE capability information, determine to enable the STxMP for the UE; or ii) in accordance with a determination that both or one of the DL RTD and the UL TTD reported in the assistance information are larger than the threshold reported in the UE capability information, determine not to enable STxMP for the UE. In some embodiments, the processor of the network device is further configured to send, to the UE, signaling to trigger transmission of the assistance information. In some embodiments, the processor if the network device is further configured to, in accordance with a determination that the indication indicates that the STxMP is enabled for the UE, receive the STxMP from the UE. In some embodiments, the signaling includes at least one or: a radio resource control (RRC) message, or downlink control information (DCI). In some embodiments, the DCI has DCI Format 0_1 or 0_2, and comprises a field to indicate transmission of the assistance information. In some embodiments, the DCI has DCI Format 0_0 and wherein at least one of reserved bits in the DCI Format 0_0 is reused to indicate transmission of the assistance information. In some embodiments, the processor of the network device is further configured to, in accordance with a determination that the indication indicates that the STxMP is disabled for the UE, determine a first panel of the multiple panels; and signal the determined first panel to the UE. In some embodiments, the processor of the network device is further configured to send, to the UE, a radio resource control (RRC) signaling indicating the first panel for the UE to determine the first panel based on the RRC signaling. In some embodiments, the processor of the network device is further configured to determine a panel as the first panel based on at least one of: i) the panel being associated with a first sounding reference signal (SRS) resource set index (SRI) field or a second SRI field adjacent to the first SRI field; ii) the panel corresponding to a signal quality that is below a threshold; iii) the panel having a lower modulation and coding scheme (MCS) index; iv) the panel without uplink control information (UCI) multiplexing on a physical uplink shared channel (PUSCH) transmission; or v) any combination thereof. In some embodiments, the processor of the network device is further configured to receive, from the UE, an indication of stopping of transmission on the first panel. In some embodiments, the processor of the network device is further configured to receive, from the UE, an uplink transmission timing difference across at least two panels of the multiple panels. In some embodiments, the processor of the network device is further configured to: i) send, to the UE, a radio resource control (RRC) signaling indicating a periodic measurement and report of the uplink transmission timing difference across the at least two panels of the multiple panels of the UE; and ii) periodically receive, from the UE, the uplink transmission timing difference across the at least two panels of the multiple panels. In some embodiments, the processor of the network device is further configured to receive, from the UE, the uplink transmission timing difference across the at least two panels of the multiple panels, where the uplink transmission timing difference across the at least two panels of the multiple panels is transmitted in response to an event being detected by the UE. In some embodiments, the processor is further configured to receive, from the UE, the uplink transmission timing difference across the at least two panels of the multiple panels via a medium access control (MAC) control element (CE). In some embodiments, the MAC CE has one octet and indicates the uplink transmission timing difference across the at least two panels of the multiple panels for each serving cell of the UE. In some embodiments, the processor is further configured to: i) send, to the UE, a radio resource control (RRC) configuration indicating a set of scheduling request (SR) resources in a physical uplink control channel (PUCCH) transmission; and ii) receive, from the UE, via the corresponding SR from the set of scheduling request (SR) resources to report the uplink transmission timing difference across the at least two panels of the multiple panels on a serving cell exceeds the UE capability. In some embodiments, the RRC configuration includes periodicity in symbols or slots and an offset in slots for the PUCCH transmission.

Figure 8:
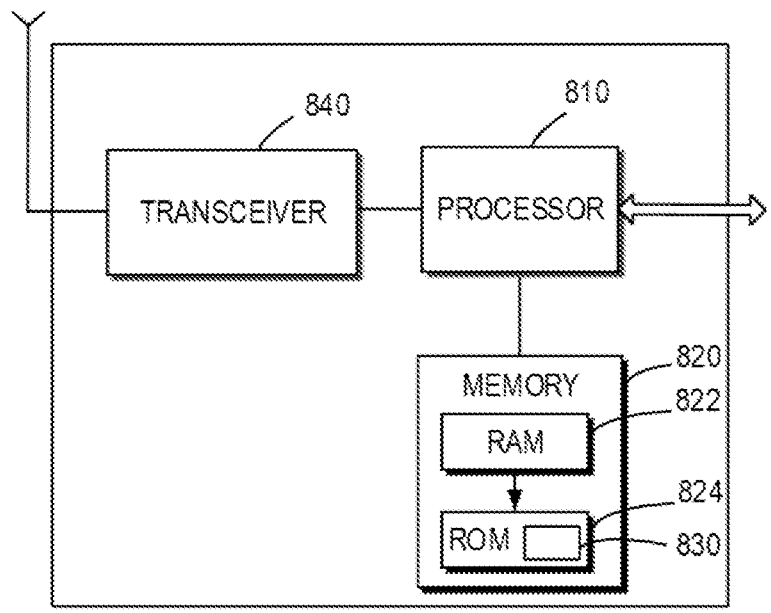
FIG. 8 illustrates a simplified block diagram of a device that is suitable for implementing embodiments of the present disclosure.

FIG. 8 is a simplified block diagram of a device 800 that is suitable for implementing embodiments of the present disclosure. For example, the TRP 110 and the UE 120 can be implemented by the device 800. As shown in FIG. 8, the device 800 includes a processor 810, a memory 820 coupled to the processor 810, and a transceiver 840 coupled to the processor 810.

The transceiver 840 is for bidirectional communications. The transceiver 840 is coupled to at least one antenna to facilitate communication. The transceiver 840 can comprise a transmitter circuitry (e.g., associated with one or more transmit chains) and/or a receiver circuitry (e.g., associated with one or more receive chains). The transmitter circuitry and receiver circuitry can employ common circuit elements, distinct circuit elements, or a combination thereof.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The program 830 may be stored in the ROM 824. The processor 810 may perform any suitable actions and processing by loading the program 830 into the RAM 822.

The embodiments of the present disclosure may be implemented by means of the program 830 so that the device 800 may perform any method of the disclosure as discussed with reference to FIGS. 2 and 7. The embodiments of the present disclosure may also be implemented by hardware or by a combination of software and hardware.

The present disclosure also provides at least one computer program product tangibly stored on a non-transitory computer readable storage medium. The computer program product includes computer-executable instructions, such as those included in program modules, being executed in a device on a target real or virtual processor, to carry out the method 700 as described above with reference to FIG. 7.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A user equipment (UE), comprising:
a transceiver configured to communicate with a network device; and
a processor communicatively coupled to the transceiver and configured to:
determine UE capability information including a value of a maximum transmission timing difference (MTTD) between uplink simultaneous transmissions on multiple panels (STxMP) in a same slot supported by the UE;
transmit the UE capability information to the network device;
transmit, to the network device, assistance information for the STxMP; and
receive, from the network device, an indication indicating whether the STxMP is enabled for the UE,
wherein the assistance information comprises at least one of:
a downlink (DL) reception timing difference (RTD) of a slot across the multiple panels, or
an uplink (UL) transmission timing difference (TTD) of a slot across the multiple panels.

2. The UE of claim 1, wherein the UE capability information further includes an indication of at least one of:
the UE supporting synchronous STxMP, or
the UE supporting asynchronous STxMP.

3. The UE of claim 2, wherein the synchronous STxMP and the asynchronous STxMP differ in terms of the value of MTTD supported by the UE between the synchronous STxMP and the asynchronous STxMP.

4. The UE of claim 1, wherein the processor is further configured to:

report, to the network device, the UE capability information for each frequency band in a band combination that is supported by the UE; or
report, to the network device, the UE capability information for each subcarrier spacing (SCS) that is supported by the UE in a band of a band combination.

5. The UE of claim 1, wherein the processor is further configured to:
receive, from the network device, signaling to trigger transmission of the assistance information.

6. The UE of claim 1, wherein the processor is further configured to:
in accordance with a determination that the indication indicates that the STxMP is enabled for the UE, perform the STxMP with the network device.

7. The UE of claim 5, wherein the signaling comprises at least one of:
a radio resource control (RRC) message, or
downlink control information (DCI).

8. The UE of claim 7, wherein the DCI has DCI Format 0_1 or 0_2, and comprises a field to indicate transmission of the assistance information.

9. The UE of claim 7, wherein the DCI has DCI Format 0_0 and wherein at least one of reserved bits in the DCI Format 0_0 is reused to indicate transmission of the assistance information.

10. A user equipment (UE), comprising:
a transceiver configured to communicate with a network device; and
a processor communicatively coupled to the transceiver and configured to:
determine UE capability information including a value of a maximum transmission timing difference (MTTD) between uplink simultaneous transmissions on multiple panels (STxMP) in a same slot supported by the UE;
transmit the UE capability information to the network device;
transmit, to the network device, assistance information for the STxMP;
receive, from the network device, an indication indicating whether the STxMP is enabled for the UE;
in accordance with a determination that the indication indicates that the STxMP is disabled for the UE,
determine a first panel of the multiple panels; and
stop transmission on the first panel.

11. The UE of claim 10, wherein the processor is further configured to:
receive a radio resource control (RRC) signaling indicating the first panel; and
determine the first panel based on the RRC signaling.

12. The UE of claim 10, wherein the processor is further configured to determine a panel as the first panel based on at least one of:
the panel being associated with a first sounding reference signal (SRS) resource set index (SRI) field or a second SRI field adjacent to the first SRI field;
the panel corresponding to a signal quality that is below a threshold;
the panel having a lower modulation and coding scheme (MCS) index;
the panel without uplink control information (UCI) multiplexing on a physical uplink shared channel (PUSCH) transmission; or
any combination thereof.

13. The UE of claim 10, wherein the processor is further configured to:

report, to the network device, stopping of transmission on the first panel.

14. The UE of claim 10, wherein the processor is further configured to:
  transmit, to the network device, an uplink transmission timing difference across at least two panels of the multiple panels.

15. The UE of claim 14, wherein the processor is further configured to:
  receive, from the network device, a radio resource control (RRC) signaling indicating a periodic measurement and report of the uplink transmission timing difference across the at least two panels of the multiple panels; and
  periodically transmit, to the network device, the uplink transmission timing difference across the at least two panels of the multiple panels.

16. The UE of claim 14, wherein the processor is further configured to:
  in response to detecting an event, transmit, to the network device, the uplink transmission timing difference across the at least two panels of the multiple panels.

17. The UE of claim 14, wherein the processor is further configured to:
  transmit, to the network device, the uplink transmission timing difference across at least two panels of the multiple panels via a medium access control (MAC) control element (CE).

18. The UE of claim 17, wherein the MAC CE has one octet and indicates the uplink transmission timing difference across the at least two panels of the multiple panels for each serving cell.

19. The UE of claim 16, wherein the processor is further configured to:
  receive, from the network device, a radio resource control (RRC) configuration indicating a set of scheduling request (SR) resources in a physical uplink control channel (PUCCH) transmission; and
  transmit, to the network device, via a corresponding SR from the set of SR resources to report the uplink transmission timing difference across the at least two panels of the multiple panels on a serving cell exceeds a UE capability.

20. The UE of claim 19, wherein the RRC configuration comprises periodicity in symbols or slots and an offset in slots for the PUCCH transmission.

21. A method for uplink simultaneous transmissions on multiple panels (STxMP) by a user equipment (UE), the method comprising:
  determining UE capability information including a value of a maximum transmission timing difference (MTTD) between uplink STxMP in a same slot supported by the UE;
  transmitting the UE capability information to a network device;
  transmitting, to the network device, assistance information for the STxMP; and
  receiving, from the network device, an indication indicating whether the STxMP is enabled for the UE,
  wherein the assistance information comprises at least one of:
    a downlink (DL) reception timing different (RTD) of a slot across the multiple panels, or
    an uplink (UL) transmission timing difference (TTD) of a slot across the multiple panels.

22. The method of claim 21, wherein the UE capability information further includes an indication of at least one of:
  the UE supporting synchronous STxMP, or
  the UE supporting asynchronous STxMP.

* * * * *